UNITED STATES PATENT OFFICE.

ZOLTAN TAMASSY, OF CLEVELAND, OHIO, ASSIGNOR OF ONE-THIRD TO ZOLTAN B. CSIKY AND ONE-THIRD TO ETEL OTS, BOTH OF CLEVELAND, OHIO.

SOLDER FOR ALUMINUM.

No. 931,523.　　　Specification of Letters Patent.　　　Patented Aug. 17, 1909.

Application filed September 28, 1908.　Serial No. 455,060.

*To all whom it may concern:*

Be it known that I, ZOLTAN TAMASSY, a citizen of the United States, residing at Cleveland, in the county of Cuyahoga and State of Ohio, have invented certain new and useful Improvements in Solder for Aluminum, and do declare that the following is a full, clear, and exact description of the invention, which will enable others skilled in the art to which it appertains to make and use the same.

This invention relates to a composition which may be used for soldering together two aluminum parts, or for closing openings or cracks in aluminum articles, or for soldering to an aluminum article a portion or part of any other metal. The character of the composition is such that it not only has sufficient adhesive quality of the right kind to lay hold of aluminum to cause two aluminum bodies to adhere together when the composition is properly applied, but, having once been applied to an aluminum surface, the surface then possesses the characteristic necessary to make effective union therewith of any common form of solder or brazing.

My composition consists of the following ingredients combined and mixed in the proportions following: 130 grains of antimony ½ pound of zinc spelter ½ pound of pure tin 44 grains of salicylic acid (powder). The manner of preparing the composition from these ingredients is as follows: First take the 130 grains of antimony, and melt the same. Then after this has thoroughly melted, add ½ pound of zinc spelter and melt therewith. After this, is melted add ½ pound of pure tin and melt as before. After these ingredients have been brought to a molten state together add 44 grains of salicylic acid. Then mix all thoroughly by stirring or agitation and the composition is ready to be poured into molds of any preferred shape according to the size and shape of bars wanted for commercial purposes.

In using my new composition it is only necessary to heat the aluminum body to such a temperature as will cause the composition to adhere thereto and then to smear or rub the surface with the stick or bar of composition until a sufficient quantity has been made to adhere to the aluminum surface. If the purpose be to close an opening or hole in an aluminum article, such for instance as a tea kettle or cooking utensil, the composition may be applied in sufficient quantity to completely close the hole or opening, or it may be applied around the edges of the opening and be the means of securing in place a patch of aluminum or other metal in sheet form. If the use is for the purpose of closing a crack in an aluminum casting, the casting will be heated so as to insure a proper temperature at the surface to be united, and then the composition is applied in a suitable quantity to fill the crack. If the object be to unite two parts, whether their separation be in an abrupt plane or an inclined plane, or in an irregular plane which enables the parts to be overlapped, the surfaces to be joined are each smeared or pasted with the composition after proper heating of the surfaces and then the parts are pressed together and held in their united relation until cohesion has taken place. If it be desired to secure a metal of another kind to an aluminum object, as for instance in applying a handle to a utensil, the aluminum surface may be smeared with the new composition and after that the handle or other attachment may be secured in place by using ordinary spelter, soldering or brazing, as circumstances may dictate.

Obviously, I may use the equivalent of any one of the several ingredients named without departing from the spirit of the invention.

What I claim is:—

1. The herein described composition of matter constituting a solder for aluminum and consisting of antimony, zinc spelter, pure tin, and salicylic acid.

2. A solder compound consisting of one hundred and thirty grains of antimony, one half pound of zinc spelter, one half pound of pure tin, and forty four grains of salicylic acid, the same being melted together, substantially as set forth.

In testimony whereof I have hereunto set my hand this 28th day of September 1908.

ZOLTAN TAMASSY.

In presence of—
　ZOLTAN B. CSIKY,
　BENNETT S. JONES.